United States Patent [19]

Lake, Jr. et al.

[11] Patent Number: 4,544,301

[45] Date of Patent: Oct. 1, 1985

[54] KEYBOARD ASSEMBLY

[75] Inventors: Ralph J. Lake, Jr., Somerville; John Steckowich, Jr., Edison; Stephen R. Solomon, Cranford, all of N.J.

[73] Assignee: Burroughs Corporation, Detroit, Mich.

[21] Appl. No.: 437,969

[22] Filed: Nov. 1, 1982

[51] Int. Cl.⁴ .............................................. F16B 5/00
[52] U.S. Cl. .................................. 403/300; 403/292; 403/405.1
[58] Field of Search ............... 403/405, 300, 301, 292, 403/402, 401, 298, 406; 52/726, 667

[56] References Cited

U.S. PATENT DOCUMENTS

| 221,109 | 10/1879 | Seiler | 403/406 |
| 2,304,126 | 12/1942 | Skeel | 403/406 |
| 3,284,977 | 11/1966 | Lickliter et al. | 52/726 X |
| 3,288,489 | 11/1966 | Jahn | 52/726 X |
| 3,855,754 | 12/1974 | Scoville | 403/406 X |
| 4,054,393 | 10/1977 | Talleri | 403/406 X |
| 4,335,973 | 6/1982 | Beck et al. | 403/300 |
| 4,389,828 | 6/1983 | Cary et al. | 52/726 X |

FOREIGN PATENT DOCUMENTS 1044840 10/1966 United Kingdom ................ 403/292

Primary Examiner—Andrew V. Kundrat
Attorney, Agent, or Firm—Kevin R. Peterson; Edmund M. Chung; Robert A. Green

[57] ABSTRACT

Coupling apparatus comprising two plates to be coupled together, with each plate carrying a locking mechanism for receiving a coupling member, the coupling member having two ends, each end being adapted to engage and couple to the locking mechanism on one of the plates whereby the two plates can be rigidly coupled together.

4 Claims, 4 Drawing Figures

U.S. Patent  Oct. 1, 1985  Sheet 1 of 2  4,544,301
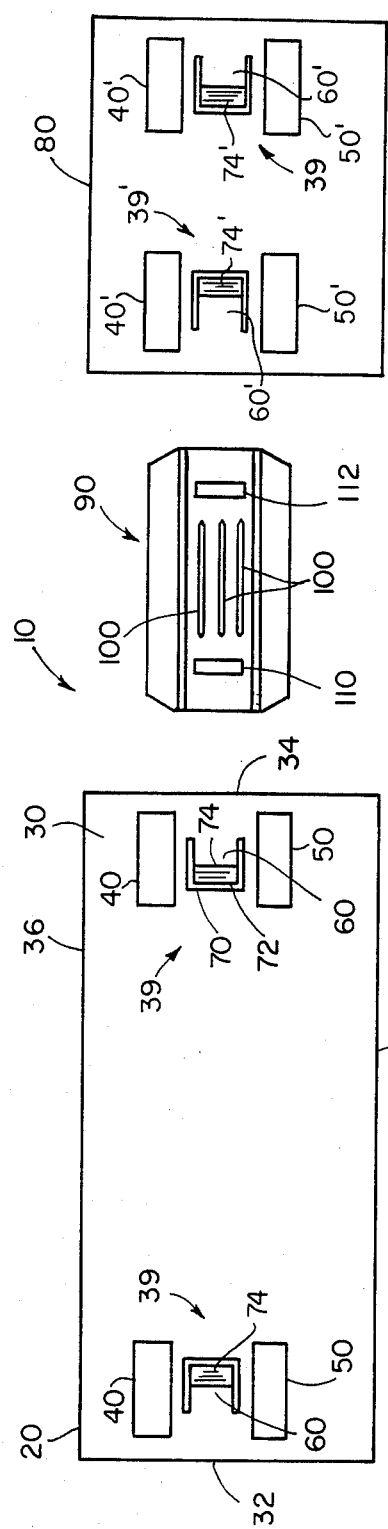
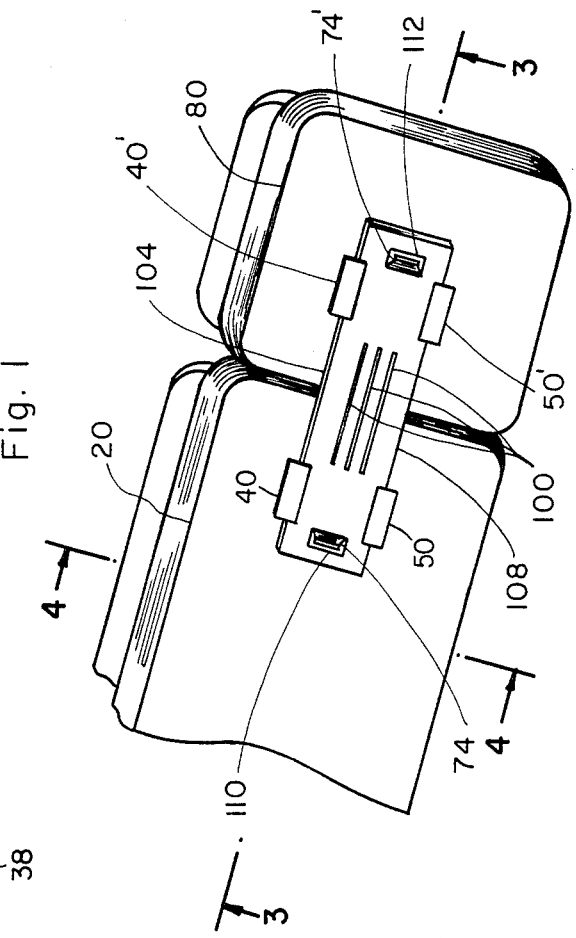
Fig. 1
Fig. 2

KEYBOARD ASSEMBLY

BACKGROUND OF THE INVENTION

Many types of electronic systems such as computers and terminals include a keyboard and an auxiliary device known as a keyboard pad. The keyboard pad is usually smaller than the keyboard and is mounted adjacent to the keyboard. Various mounting arrangements are known for coupling together a keyboard and an auxiliary device such as a keyboard pad. However, these known arrangements are relatively complex and are generally unsatisfactory.

The present invention provides a relatively simple arrangement for coupling together a keyboard and a keyboard pad.

DESCRIPTION OF THE DRAWINGS

FIG. 1 is an exploded plan view of apparatus embodying the invention as seen from the lower surface thereof;

FIG. 2 is a perspective view of the apparatus of FIG. 1 shown assembled;

DESCRIPTION OF THE INVENTION

Figure 3:
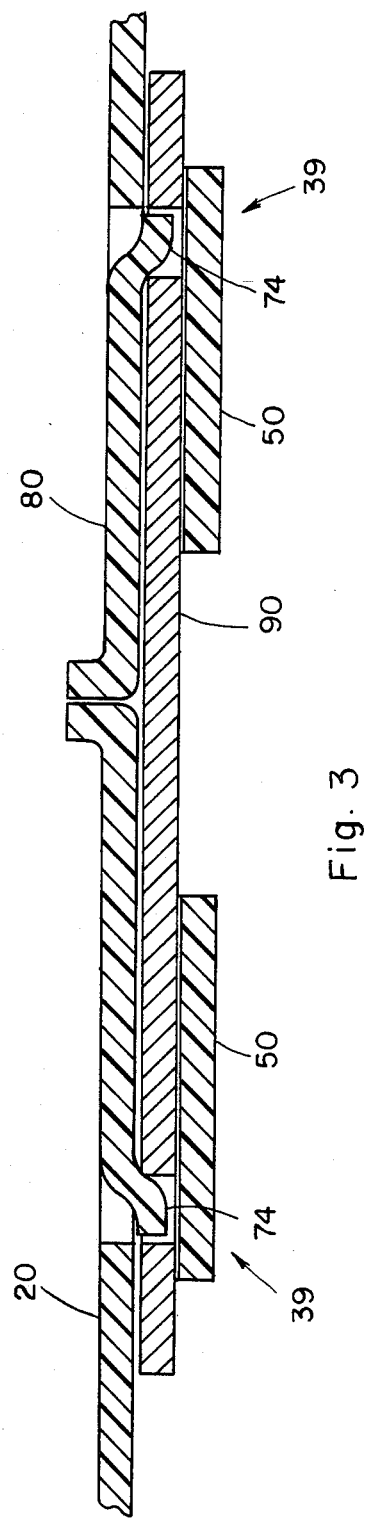
FIG. 3 is a sectional view along the lines 3—3 in FIG. 2.
Figure 4:
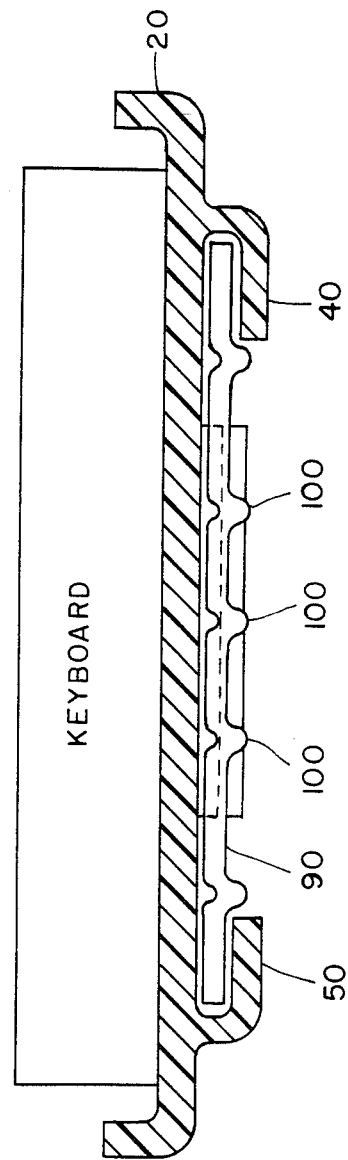
FIG. 4 is a sectional view along the lines 4—4 in FIG. 2.

The assembly of the invention 10 includes a relatively large-area molded plastic base 20 which is intended to support a keyboard. The base 20, looking at the lower surface 30 in FIG. 1, has a left edge 32 and a right edge 34 and upper edge 36 and lower edge 38. Formed integrally in the base, adjacent to the right hand edge of the base, is an assembly 39 made up of upper and lower integrally molded plastic strips 40 and 50 which are oriented longitudinally and spaced apart a small distance away from the lower surface of the base. A spring-like tab 60 is formed from the base itself by means of a generally U-shaped opening 70 formed in the base and defining the tab. The tab 60 has a certain flexibility with respect to the base and acts like a spring. The end 72 of the tab 60 includes, at its end adjacent to the opening, a raised locking strip 74, for a purpose to be described. A second assembly 39, identical to the first assembly 39 and carrying the same reference numerals, is provided adjacent to the left hand edge of the base, including the spaced-apart ways or strips 40 and 50 and flexible spring-like tab 60 having a raised locking strip 74.

A second molded plastic base 80, which is to be coupled to the first base and is intended to support a key pad, is also provided with left and right assemblies of the type described with respect to the keyboard base 20. These assemblies are denoted by reference numeral 39', and the corresponding parts carry the same reference numerals as in assemblies 39 but with a prime notation.

A coupling member 90 for coupling together the two bases 20 and 80 comprises a relatively rigid metal plate having longitudinal ribs 100 extending along the central portion of the plate and operate as stiffeners. The plate also includes upper and lower portions 104 and 108 of such a thickness that they can be slipped into place under the spaced-apart strips of an assembly 39. The metal plate has two transverse slots or openings 110 and 112, one near each end, of such a size and shape that, when the plate 90 is inserted between the strips 40 and 50 of an assembly 39 and pushed forwardly sufficiently, the elevated locking strip 74 of the spring tab 60 engages and locks into place in the slot 110 or 112 in the metal strip.

The metal strip 90 is intended to have one end coupled to either the right or left gripping assembly 39 of base 20, and the second base 80 is coupled in similar fashion to the other free end of the metal plate to couple the two bases together along with the keyboard and key pad that they carry.

What is claimed is:

1. Coupling apparatus comprising
first and second plate-like members to be coupled together,
said first member having a top surface for supporting a keyboard and a bottom surface,
said second member having a top surface for supporting a key pad and a bottom surface,
the bottom surface of said first member carrying two spaced-apart coupling plates which are parallel to each other and are spaced above the bottom surface of said first member to provide a space between said coupling plates and said bottom surface,
the body of said first member between said coupling plates including a flexible plate having a raised locking tab which extends above the bottom surface of said first member,
the bottom surface of said second member carrying two spaced-apart coupling plates which are parallel to each other and are spaced above the bottom surface of said second member to provide a space between said coupling plates and said bottom surface,
the body of said second member between said coupling plates including a flexible plate having a raised locking tab which extends above the bottom surface of said second member, and
a rigid plate-like coupling member having first and second ends and a first slot at said first end and a second slot at said second end,
said slots having substantially the same shape and area as said raised locking tabs,
said rigid plate-like coupling member being adapted to have said first end inserted under the coupling plates of said first member with the locking tab thereof seated in said first slot to lock the coupling member in place,
said rigid plate-like coupling member being adapted to have said second end inserted under the coupling plates of said second member with the locking tab thereof seated in said second slot to lock the coupling member in place and thereby to secure said coupling member to said first and second members.

2. The apparatus defined in claim 1 wherein said coupling plates are defined by means of slots formed in the bodies of said first and second members.

3. The apparatus defined in claim 1 wherein said coupling plates are thin rectangular strips oriented parallel to each other and to the long axis of its member, the coupling plates of one member being axially aligned with the corresponding coupling plates of the other member so that when the first and second members are coupled together, they are axially aligned.

4. The apparatus defined in claim 1 wherein a generally U-shaped opening is provided in the body of each of said members to form said flexible plates.

* * * * *